US012771599B2

(12) United States Patent
Du et al.

(10) Patent No.: US 12,771,599 B2
(45) Date of Patent: Oct. 20, 2026

(54) NETWORK RECONFIGURATION FOR CLUSTER

(71) Applicant: Rubrik, Inc., Palo Alto, CA (US)

(72) Inventors: Fan Du, Santa Clara, CA (US); Beibei Liu, Santa Clara, CA (US)

(73) Assignee: Rubrik, Inc., Palo Alto, CA (US)

(*) Notice: Subject to any disclaimer, the term of this patent is extended or adjusted under 35 U.S.C. 154(b) by 78 days.

(21) Appl. No.: 19/035,635

(22) Filed: Jan. 23, 2025

(65) Prior Publication Data

US 2026/0214001 A1 Jul. 23, 2026

(51) Int. Cl.
*H04L 41/084* (2022.01)
*H04L 45/741* (2022.01)

(52) U.S. Cl.
CPC .......... *H04L 41/084* (2013.01); *H04L 45/741* (2013.01)

(58) Field of Classification Search
CPC ............................ H04L 41/084; H04L 45/741
USPC .......................................................... 709/220
See application file for complete search history.

(56) References Cited

U.S. PATENT DOCUMENTS 7,818,408 B1 * 10/2010 Ignatuk ............... G06F 11/2033 370/254
8,484,322 B2 * 7/2013 Ogawa .................... H04L 45/00 709/224
9,178,716 B2 * 11/2015 Vaswani ................ G01D 21/00
10,063,459 B2 * 8/2018 Judge ...................... H04L 47/33
2013/0212235 A1 * 8/2013 Fulton .................... G05B 11/01 709/220
2015/0039742 A1 * 2/2015 Vaswani ................ G01D 21/00 709/223
2022/0038379 A1 * 2/2022 Boutros .............. H04L 41/0806
2023/0254213 A1 * 8/2023 Power ................. H04L 41/0896 709/220

FOREIGN PATENT DOCUMENTS

EP 3254416 B1 * 7/2020 ............ H04W 72/56
WO WO-2010145164 A1 * 12/2010 ......... H04L 61/5076
WO WO-2022143161 A1 * 7/2022 ........... H04L 61/507

* cited by examiner

*Primary Examiner* — Anthony Mejia
(74) *Attorney, Agent, or Firm* — Holland & Hart LLP

(57) ABSTRACT

Methods, systems, and devices for data management are described. A new network configuration may be received for a cluster of nodes, where the respective nodes may have respective routable network addresses in accordance with an existing network configuration of the cluster. The new network configuration may be configured to change the respective routable network addresses. Based on receiving the new network configuration, a driving network interface between the existing network configuration and the new network configuration may be identified. It may be determined that the respective nodes are communicatively coupled over the driving network interface using respective local network addresses of the respective nodes. Based on the respective nodes being communicatively coupled via the driving network interface using the respective local network addresses, a process for configuring the new network configuration at the cluster may be executed via the driving network interface.

20 Claims, 7 Drawing Sheets

NETWORK RECONFIGURATION FOR CLUSTER

FIELD OF TECHNOLOGY

The present disclosure relates generally to data management, including techniques for network reconfiguration for cluster.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A network configuration of a cluster of nodes may be changed from an existing network configuration to a new network configuration—e.g., by a customer that operates a computing system associated with the cluster of nodes. In some examples, a "driving" node of the cluster may be designated to implement the network reconfiguration across all the nodes of the cluster. The driving node may implement the network reconfiguration using routable Internet Protocol (IP) addresses of the other nodes associated with an existing network configuration of the cluster. In some examples, once the driving node triggers the execution of a network configuration procedure at another node of the cluster, the driving node may lose access to the node. In such cases, if the new network configuration is unsuccessfully applied at a node, the driving node may be unable to reconnect to the node—e.g., using the new routable IP addresses.

Accordingly, the driving node in the cluster of nodes may not have full control of, or visibility into, the other nodes throughout the Cluster Re-IP procedure, and failures in applying the network configuration may be difficult for the driving node to detect, correct, or both. Thus, implementations (e.g., methods, systems, apparatuses, techniques, configurations, components) that support a network reconfiguration process for a cluster that allows a driving node of the cluster to maintain control of, and visibility into, the network reconfiguration at the other nodes of the cluster throughout the network reconfiguration process may be desired.

To allow a driving node of a cluster to maintain control of, and visibility into, the network reconfiguration process at the other nodes of the cluster throughout the network reconfiguration process, the driving node may maintain connectivity to the other nodes in the cluster throughout the network reconfiguration process based on using local (e.g., link local IPv6) addresses associated with a network interface that does not change as a result of the network reconfiguration process. Also, to maintain control of, and visibility into, the execution of the network configuration process throughout the network reconfiguration process, the driving node may itself orchestrate the execution of at least a portion of (e.g., all) the network reconfiguration operations (e.g., in a run-to-completion mode) at the other nodes, including operations for validating the new network configurations at the other nodes.

Figure 1:
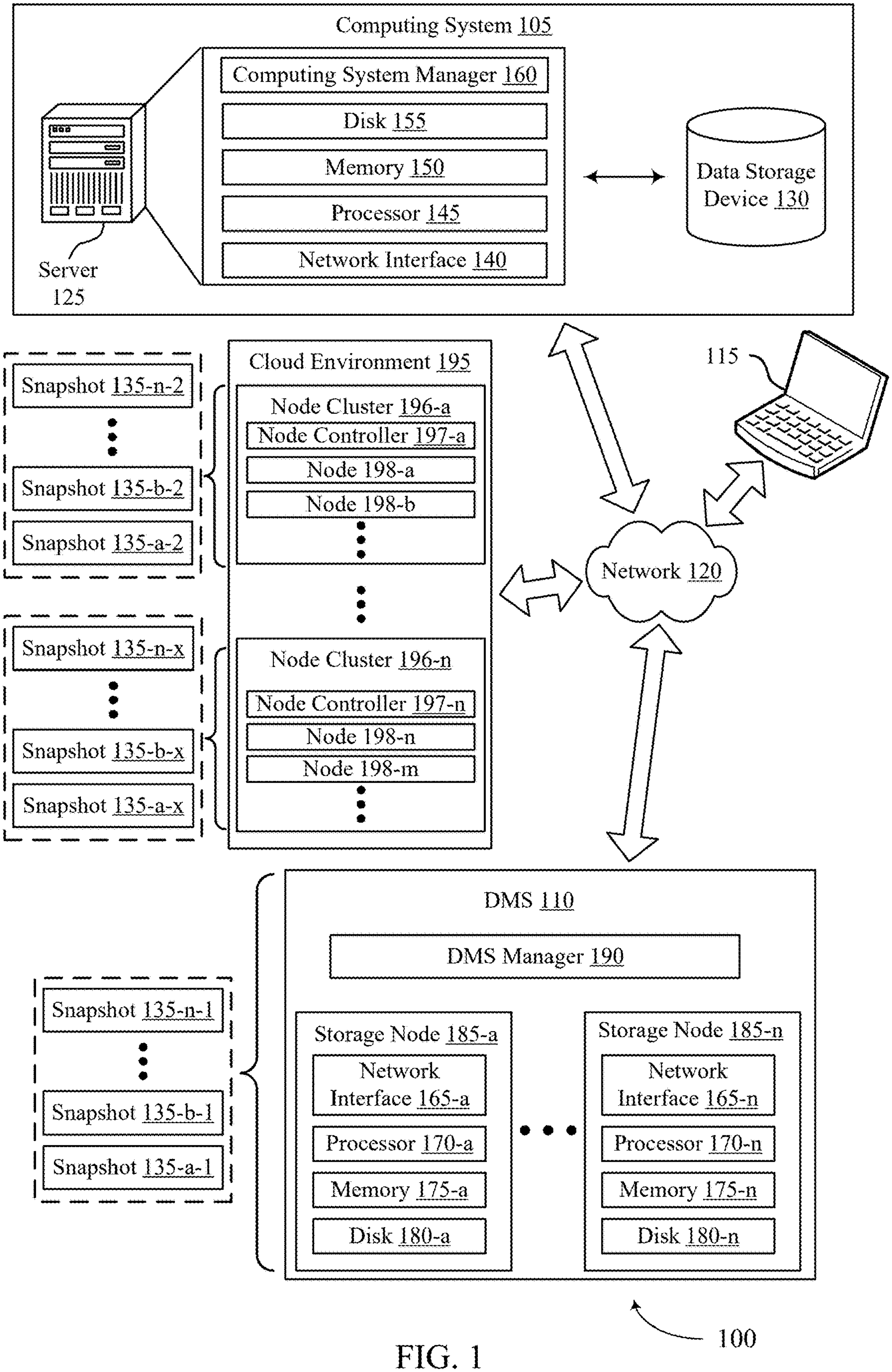
FIG. 1 illustrates an example of a computing environment that supports network reconfiguration for cluster in accordance with aspects of the present disclosure.

FIG. 1 illustrates an example of a computing environment 100 that supports network reconfiguration for cluster in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructureas-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

A DMS may include one or more clusters of nodes. Each cluster of nodes may include multiple nodes. Each node in a cluster may have its own network configuration. A network configuration of a node may include one or more network interfaces, and for each of the network interfaces, an Internet Protocol (IP) address and a network mask. In some examples, one or more of the nodes in a cluster may share a network mask, a network interface, or any combination thereof. In some examples, the nodes are associated with a native network interface (e.g., an ethernet network interface, a wireless network interface, a virtual ethernet interface, a bonded network interface, etc.). A native network interface may be a main network interface on a network device (e.g., a switch, router, or server) that handles untagged traffic associated with multiple virtual local area networks (VLANs). The nodes may also be associated with one or more VLANs. A VLAN may be a logical group of network devices (e.g., nodes) that are segmented into different broadcast domains at a data link layer. In some examples, the nodes are associated with a native VLAN, which may carry untagged network traffic and may also be referred to as VLAN 0 or untagged ethernet. A bonded network interface may be an aggregation of multiple physical network interfaces, which may support load balancing, failover, and the like.

Each network interface associated with each node in a cluster may be assigned a routable IP address. A routable IP address may be local or public. A routable IP address may be formatted in accordance with an IP version 4(IPv4) address format or an IP version 6 (IPv6) address format.

One or more network interface associated with each node in a cluster may also be assigned a link local IPv6 address, which may be formatted in accordance with the IPv6 format. Each link local IPv6 address may be associated with a media access control (MAC) address of a corresponding network interface. Further, each link local IPv6 address may be static (e.g., may not change). Link local IP addresses are valid only on the associated network interface and may be reachable within a broadcast domain. As such, each node in a cluster may be located in the same broadcast domain for all network interfaces.

In some examples, the main functionality of the cluster may be delivered using routable IP addresses of the nodes. However, the network environment may allow the nodes to communicate (e.g., directly) with one another using link local IPv6 addresses via at least one of network interface in the network environment. In some examples, a node may use a secure shell (SSH) protocol to connect to another node based on a link local IPv6 address for the other node (x.y.z), a network interface (e.g., eth0 or bond0) associated with the node, etc.—e.g., by using the command ssh fe80 . . . x.y.z%eth0. If the other node is on a VLAN, the node may use a modified command: ssh fe80 . . . x.y.z%eth0.100, though the base network interface referenced in the modified command may remain the same.

In some examples, the nodes in a cluster are configured to have a uniform network configuration. For example, the nodes in the cluster may be provisioned with identical network interfaces (e.g., native interfaces or VLANs, IPv4 or IPv6) and identical IP subnets (e.g., logical subdivisions of an IP network) corresponding to those interfaces.

A network configuration of one or more nodes in a DMS (e.g., one or more nodes in a cluster of nodes) may be changed—e.g., by a customer that operates a computing system. The process for changing the network configuration of the one or more nodes in the cluster may be referred to as a Cluster Re-IP. In some examples, changing the network configuration of the one or more nodes involves updating IP addresses, network masks, or both, on existing network interfaces. In some examples, changing one or more IP addresses of the one or more nodes involves adding network interfaces along with IP address, network masks, or both. In some examples, changing one or more IP addresses of the one or more nodes involves removing network interfaces along with IP address, network masks, or both.

A driving node at the DMS may be used to manage the Cluster Re-IP procedure. For example, the driving node may connect to each node in the cluster, generate or deploy a new network configuration, and request a reboot or network restart on that node. Thus, at the end of the Cluster Re-IP procedure, the new network configuration may be configured at each node.

In some examples, the driving node connects to the other nodes using a secure connection (e.g., a connection using an SSH protocol)—e.g., via the routable IP addresses of the other nodes. As such, once the new network configuration is triggered/applied at the node (e.g., once the routable IP address of the node changes), the secure connection may be lost. Moreover, after the driving node loses access to a node (e.g., after the secure connection is lost), in some examples, the node may unsuccessfully apply the new network configuration—e.g., network conditions (e.g., IP conflicts, firewall conflicts) may block connectivity after the node applies the new network configuration. Thus, after a new network reconfiguration is triggered by the driving node, details of the network reconfiguration procedure during the network reconfiguration may be unknown to the driving node. Also, until the driving node establishes a new connection to the node (if possible), the network status of the node may be unknown to the driving node—e.g., the node may be in one of the following network reconfiguration states: (1) successfully transitioned to new network configuration; (2) maintained original network configuration due to issues with applying the new network configuration; (3) lost the original network configuration and failed to apply the new network configuration; (4) successfully transitioned to new network configuration but has issues accessing the network due to IP conflicts, firewall conflicts, etc.

In the first state, the driving node may be capable of confirming the network reconfiguration procedure completed successfully by accessing the other nodes using the new network configuration (e.g., including the new routable IP address). In the second state, the driving node may be capable of determining the network reconfiguration procedure failed for certain nodes (e.g., after failing to connect to the nodes using the certain new network configuration) and that the nodes reverting to their prior network configuration by accessing certain of the nodes using the preceding network configuration (e.g., including the preceding routable IP address). In the third and fourth states, there may be significant complexity associated with the driving node reconnecting to the node (e.g., using the new or preceding routable IP address). In some examples, for the third and fourth states, the driving node may be unable to reconnect to the node entirely. Thus, the driving node may be unable to check the network reconfiguration status of the node, to troubleshoot any issues that occurred during the network reconfiguration procedure, or the like.

As a result of the driving node losing its connection to other nodes after the network reconfiguration is initiated, a customer may be required to log into each node to check the status of the network reconfiguration operation at the node—e.g., as the driving node may be unable to determine a cause of the failure of the network configuration at the node after the connection is lost. For example, if a node transitions to the new network configuration but firewall rules prevent the driving node from reconnecting to the node using the new routable IP address, the driving node may be unable to connect to the node to confirm whether the node successfully transitioned to the new network configuration. Similarly, if a node fails to transition to the new network configuration and is unable to revert to the prior network configuration, the driving node may be unable to connect to the node using the new routable IP address to confirm whether the node successfully transitioned to the new network configuration.

Thus, a customer (e.g., if the node is implemented using local infrastructure), or an operator of the node (e.g., if the node is implemented using third party infrastructure) may be required to log in to the node (e.g., from a local network) to identify whether the node successfully deployed the new network configuration. If the customer determines that the node successfully implemented the new network configuration, the customer may troubleshoot other potential issues, such as IP conflicts, firewall conflicts, etc. in an attempt to restore external access to the node. If the customer determines that the node failed to implement the new network configuration, the customer may review logs related to the network configuration stored at the node (e.g., to identify a cause of the network configuration failure), attempt to manually reconfigure a desired network configuration a second time (e.g., the preceding network configuration, the new network reconfiguration), or both.

Loss of the secure connection between the driving node and the other nodes may also prevent current Cluster Re-IP procedures from supporting an automated rollback of the network configuration in the event of a failure. Similarly, loss of the secure connection may prevent current Cluster Re-IP procedures from supporting an automated dry run operation that allows a customer to test the new network configuration before adopting the new network configuration—e.g., in a dry run operation that temporarily configures the new network configuration and confirms connectivity using the new network configuration.

Accordingly, the driving node in the cluster of nodes may not have full control of, or visibility into, the other nodes throughout the Cluster Re-IP procedure, and failures in applying the network configuration may be difficult for the driving node to detect, correct, or both. Thus, implementations (e.g., methods, systems, apparatuses, techniques, configurations, components) that support a network reconfiguration process for a cluster that allows a driving node of the cluster to maintain control of, and visibility into, the network reconfiguration at the other nodes of the cluster throughout the network reconfiguration process may be desired.

To allow a driving node of a cluster to maintain control of, and visibility into, the network reconfiguration process at the other nodes of the cluster throughout the network reconfiguration process, the driving node may maintain connectivity to the other nodes in the cluster throughout the network reconfiguration process based on using local (e.g., link local IPv6) addresses associated with a network interface that does not change as a result of the network reconfiguration process. Also, to maintain control of, and visibility into, the execution of the network configuration process throughout the network reconfiguration process, the driving node may itself orchestrate the execution of at least a portion of (e.g., all) the network reconfiguration operations (e.g., in a run-to-completion mode) at the other nodes, including operations for validating the new network configurations at the other nodes.

In some examples, a DMS (e.g., the DMS 110) may receive a new network configuration for a cluster of nodes associated with managing data for a computing system (e.g., the computing system 105). The nodes of the cluster may each have respective routable network addresses (e.g., IP addresses) in accordance with an existing network configuration of the cluster. The routable network addresses may be IPv4 or IPv6 addresses that allow the nodes to be accessed via an external network (e.g., the Internet). The new network configuration may be used to reconfigure the respective routable network addresses of the nodes in accordance with the new network configuration.

Based on receiving the new network configuration, the DSM may identify a "driving" network interface in the existing network configuration. The driving network interface may remain unchanged (e.g., will have a same name, same physical connection, etc.) after the new network configuration is applied. The driving network interface may be an ethernet interface with VLAN disabled (e.g., as defined in IEEE 802.1q), an ethernet interface with VLAN enabled (e.g., as defined in IEEE 802.1q), a bonded interface, or the like. The nodes may also be able to communicate with one another via the driving network interface using respective local addresses (e.g., link local IPv6 addresses).

Based on determining that the nodes are able to communicate with one another via the driving network interface using local addresses, the DMS (e.g., via a node of the cluster that is designated as the "driving" node) may execute a process for implementing the new network configuration at the cluster via the driving network interface. In some examples, the driving node may control the execution of each operation in the process at each node—e.g., the driving node may direct the nodes to execute each operation in parallel after the previous operation has completed, and so on.

By accessing the other nodes of the cluster via a network interface that does not change from an existing network configuration to a new network configuration and using static local addresses associated with the network interface, a driving node for a network reconfiguration process may maintain a connection to the other nodes throughout, and after, the network reconfiguration process.

By maintaining the connection to the other nodes throughout, and after, the network reconfiguration process, the driving node may be capable of controlling the network configuration process at the nodes throughout the process as well as validating the network configuration process for the nodes. Thus, the driving node may synchronize the execution of the network reconfiguration process across the other nodes and may have global knowledge of the network reconfiguration process for each of the other nodes throughout the execution of the network reconfiguration process. As such, the driving node may be capable of providing detailed status information for each of the other nodes to a customer throughout, or after a completion (e.g., including with failures) of, the network reconfiguration process.

By maintaining the connection to the other nodes throughout, and after, the network reconfiguration process and having global knowledge of the network reconfiguration process, the driving node may support rolling back the network reconfiguration process—e.g., if the new network reconfiguration process fails, or as part of a dry run procedure used to confirm the new network reconfiguration will complete successfully before its application.

Figure 2:
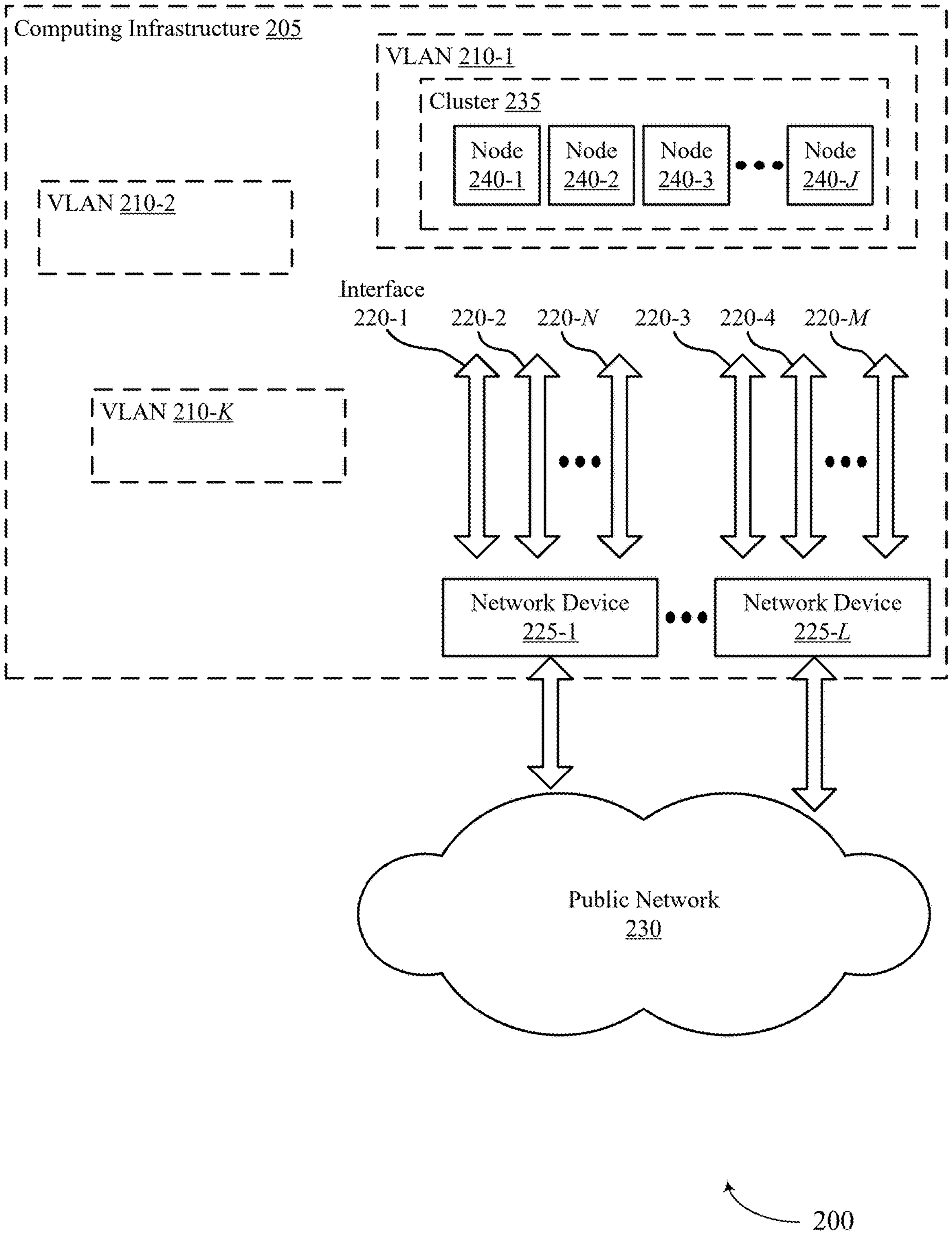
FIG. 2 shows an example of a system that supports network reconfiguration for cluster in accordance with aspects of the present disclosure.

FIG. 2 shows an example of a system that supports network reconfiguration cluster in accordance with examples as disclosed herein.

The system 200 may include the computing infrastructure 205. The computing infrastructure 205 may include computing resources of a customer. In some examples, the computing infrastructure 205 includes computing resources that are on-premises, off-premises (e.g., in the cloud), or both. The computing infrastructure 205 may be connected to a public network 230 (such as the Internet) via one or more network devices (e.g., the first network device 225-1 through the Lth network device 225-L). In some examples, the one or more network devices may be modems, routers, or a combination thereof.

The one or more network devices may be connected to computing resources within the computing infrastructure 205 via one or more network interfaces (e.g., the first network interface 220-1 and the second network interface 220-2 through the Nth network interface 220-N, and the third network interface 220-3, the fourth network interface 220-4 through the Mth network interface 220-M). The one or more network interfaces may be wired network interfaces (e.g., ethernet interfaces), wireless network interfaces (e.g., Wi-Fi interfaces), or the like. In some examples, the computing resources connected to a network device may be considered to be within a local area network (LAN). For example, a set of computing resources connected to the first network device 225-1 may be considered to be in a first LAN, and a second set of computing resources connected to the Lth network device 225-L may be considered to be in a second LAN.

In some examples, virtual local area networks, (e.g., VLANs) may be defined within the computing infrastructure 205. In some examples, the computing infrastructure may include one or more VLANs (e.g., the first VLAN 210-1 and the second VLAN 210-2 through the Kth VLAN 210-K).

Computing resources within the computing infrastructure may be associated with one or more interfaces, one or more VLANs, or any combination thereof. For example, the cluster 235 of nodes (e.g., the first node 240-1, the second node 240-2, and the third node 240-3 through the Jth node 240-J) may be associated with the first VLAN 210-1. In some examples, each node of the cluster 235 may have a respective routable IP address. Each node of the cluster 235 may also be associated with the same set of interfaces, a same set of network masks, a same set of network devices, or any combination thereof. In some examples, the cluster 235 may be determined as having a uniform network configuration if each node of the cluster 235 is associated with the same set of interfaces and the same subnets. The nodes may be located on-premises, off-premises (e.g., in a cloud environment), or a combination thereof.

As described herein, one or more of the interfaces may support direct communications between computing resources in the computing infrastructure 205 by way of local addresses (e.g., link local IPv6 addresses). Such local addresses may be static and may remain unchanged in the event a network configuration of the computing resources is modified—e.g., in the event interfaces are renamed, added, removed, or reallocated; routable IP address of the computing resources is changed; subnets are modified, added, removed, or reallocated; network devices are renamed, added, removed, or reallocated, etc. For example, the first network interface 220-1 may support direct communication between computing resources using first link local IPv6 addresses. Additionally, or alternatively, the second network interface 220-2 may support direct communication between computing resources using second link local IPv6 addresses.

As described herein, a network configuration for the cluster 235 may be modified. In such cases, a driving node of the cluster may be selected (e.g., the first node 240-1) to implement a new network configuration across the cluster. As further described herein, including with reference to FIG. 3, the driving node may maintain control of, and visibility into, an execution of portions of the network configuration process that are performed at the nodes of the cluster 235 throughout the network configuration process. Thus, the driving node may be capable of detecting and, in some examples, correcting issues that occur during, and after, portions of the network configuration process that are executed at other nodes. Additionally, or alternatively, the driving node may be capable of rolling back a network configuration to the preceding network configuration after a new network configuration is applied to the cluster 235 (e.g., in the event of one or more node failures, if a dry run mode was activated, etc.).

Figure 3:
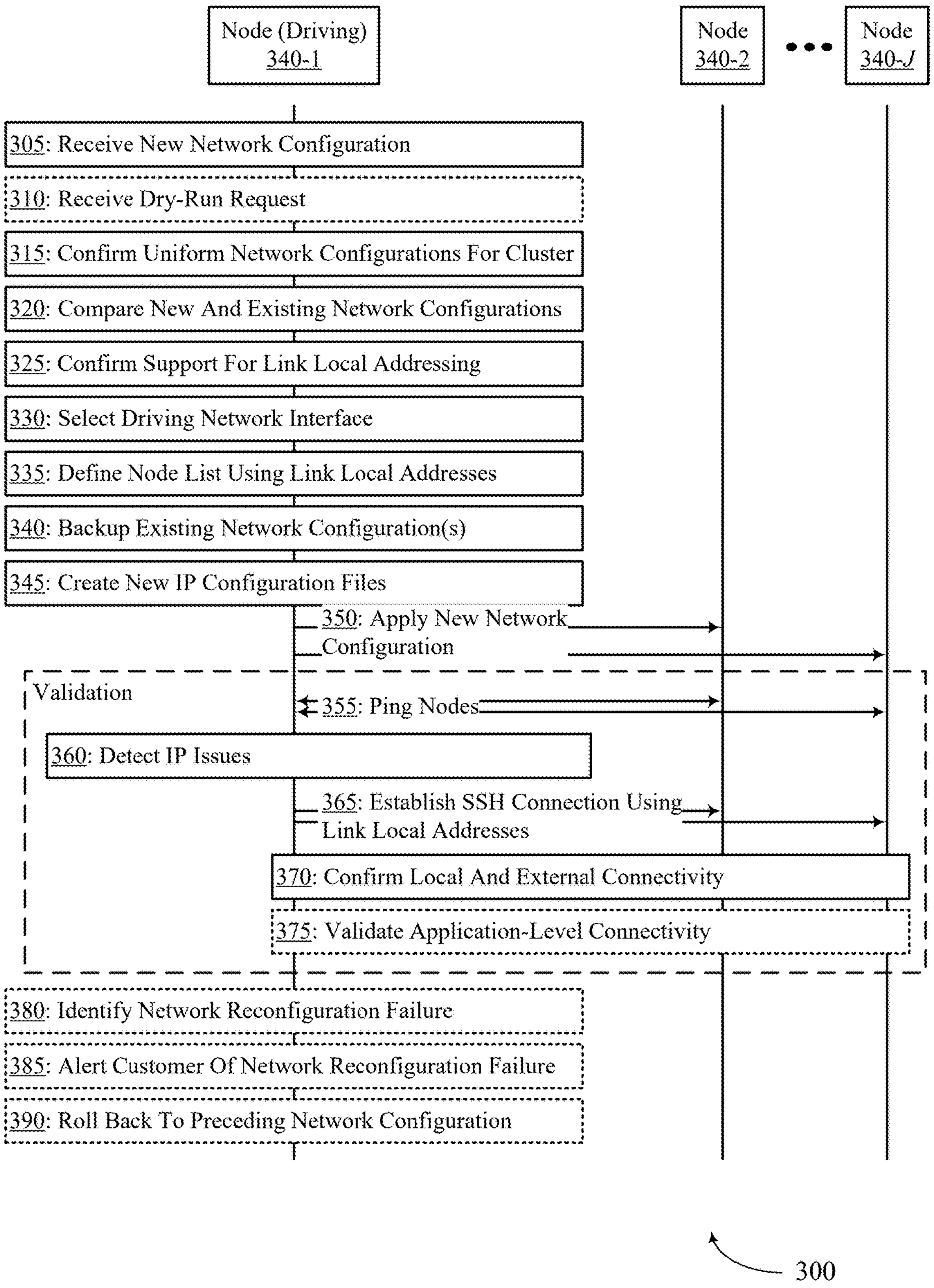
FIG. 3 shows an example of a set of operations for network reconfiguration for cluster in accordance with aspects of the present disclosure.

FIG. 3 shows an example of a set of operations for network reconfiguration cluster in accordance with examples as disclosed herein.

The process flow 300 may be performed by a cluster of nodes (e.g., the first node 340-1 and the second node 340-2 through the Jth node 340-J) as described herein, including with reference to FIG. 2. In some examples, the process flow 300 shows an example set of operations performed to support network reconfiguration cluster. For example, the process flow 300 may include operations for reconfiguring a network configuration of a cluster of nodes using a driving node that is capable of maintaining a connection to the other nodes of the cluster throughout, and after, the network reconfiguration process; diagnosing and correcting network configuration failures that occur at the other nodes throughout, and after the network reconfiguration process; rolling back the network configuration of the cluster to a preceding network configuration, or any combination thereof.

At 305, a new network configuration for the cluster may be received—e.g., at the first node 340-1 (which may be the driving node) or a different node. The new network configuration may indicate new IP addresses for the cluster; modified, added, or removed network interfaces associated with the cluster; modified, added, or removed subnets associated with the cluster; modified, added, or removed VLANs, or both associated with the cluster; and the like.

At 310, a request to apply the new network configuration as a "dry run" may be received. Based on receiving the request, the driving node may be configured to reconfigure the existing network configuration at the cluster after implementing the new network configuration at the cluster (e.g., after executing the operations described with reference to 310 through 375). In some examples, the driving node may be configured to record results of the network configuration executed during the dry run—e.g., to capture failures (if any) that occur during the network reconfiguration, to confirm success of the network reconfiguration, etc. In some examples, a request to apply the new network configuration as a "dry run" is not received (e.g., if the dry run mode is disabled or not configured at the node).

At 315, whether the new network configuration for the cluster qualifies as a uniform network configuration may be determined (e.g., at the driving node or a different node). In some examples, to determine whether the new network configuration for the cluster is a uniform network configuration, it is confirmed that a same set of network interfaces is associated with the nodes, that a same subnet is associated with the nodes, etc. In some examples, it may also be determined whether the existing network configuration qualifies as a uniform network configuration.

In some examples, it may be determined that the existing network configuration, the new network configuration, or both do not qualify as a uniform network configuration. In some examples, in such cases, a network reconfiguration process that uses routable IP addresses may be used.

At 320, the new network configuration may be compared with the existing network configuration. In some examples, comparing the new network configuration with the existing network configuration may include identifying network configurations (e.g., network interfaces, subnet configurations, etc.) that have been added, modified, deleted, or reallocated. Comparing the new network configuration may include identifying one or more "driving" network interfaces in the new network configuration that are also included in the existing network configuration.

In some examples, it may be determined that at least one driving network interface is common to the new network configuration and the existing network configuration—e.g., based on determining that the name of the network interface remains the same from the existing network configuration to the new network configuration. For example, it may be determined that one or more physical network interfaces (e.g., "eth0" and "eth1") remain the same name from the existing network configuration to the new network configuration. In some examples, the common network interface can be on a native VLAN or a VLAN. For example, if the common network interface is on the native VLAN and named eth0 or bond0, the driving node may connect to another node via the common network interface using the command ssh fe80 . . . x.y.z%eth0 or ssh fe80 . . . x.y.z%bond0, where x.y.z may be a link local IPv6 address. In another example, if the common network interface is on a VLAN and named eth0.100 or bond.200, the driving node may connect to another node via the common network interface using the command ssh fe80 . . . x.y.z%eth0.100 or ssh fe80 . . . x.y.z%bond0.200.

In some examples, it may be determined that at least one driving network interface is common to the new network configuration and the existing network configuration despite VLAN changes occurring on all of the network interfaces. For example, for the existing network configuration, the VLAN network interfaces may include eth0.100 and eth1.100 and, for the new network configuration, the VLAN network interfaces may include eth0.200 and eth1.200. In some examples, link local addressing used for the existing ethernet interfaces with VLAN enabled may also be used for the new VLAN configuration on the existing ethernet interfaces—e.g., because the existing VLANs may depend on the same the native interfaces, eth0 and eth1, as the new VLANs.

In some examples, it may be determined that no network interface is common to the network configuration and the existing network configuration. In some examples, in such cases, a network reconfiguration process that uses routable IP addresses may be used.

At 325, whether the driving network interface supports link local addressing may be determined. In some examples, the link local addressing may use link local IPv6 addressing.

In some examples, based on determining that the name of at least one network interface remains the same from the existing network configuration to the new network configuration, it may be determined whether the driving network interface supports link local addressing. In some examples, it may further be determined whether link local addressing is enabled for the driving network interface. In some examples, the one or more driving network interfaces may be iterated through (e.g., by the driving node), and the first driving network interface identified as supporting link local addressing may be selected for the reconfiguration procedure. The first driving network interface may be on a native VLAN or a VLAN. In some examples, confirming the first driving network interface supports link local addressing includes pinging (e.g., by the driving node) the link local addresses of each node in the cluster via the first driving network interface.

In some examples, based on determining that at least one driving network interface is common to the new network configuration and the existing network configuration despite VLAN changes occurring on all of the network interfaces, it may be determined whether one or more of the driving native network interfaces supports link local addressing, as similarly described above.

At 330, the driving network interface for the network reconfiguration procedure may be selected. In some examples, the first driving network interface identified as supporting link local addressing may be selected for the reconfiguration procedure.

At 335, a list of the nodes in the cluster may be generated based on the respective link local addresses of the nodes and, in some examples, the driving network interface. In some examples, the list of the nodes are included in an Ansible® inventory. Based on creating the list of the nodes using the respective link local addresses, network reconfiguration and validation operations may be applied (e.g., by the driving node) to the nodes in parallel, synchronously, or both—using the link local addresses and the driving network interface. In some examples, the driving node may be configured to wait until a particular network reconfiguration operation has been completed at each of the other nodes before initiating a next network reconfiguration operation. Accordingly, the driving node may maintain control of, and visibility into, an execution of the network reconfiguration process across the nodes throughout, and after, the network reconfiguration process—e.g., the driving node may be capable of determining the current network configuration operation being applied to each node and whether the current network configuration operation succeeded at each node. As such, in the event of a network reconfiguration failure at one or more of the other nodes, the driving node may be able to determine the particular network configuration operation that caused a failure at a failed node.

In some examples, if the driving node uses routable IP addresses to implement the network reconfiguration process, the driving node would lose access to the other nodes at some point during application of the respective new network configurations at the other nodes (e.g., once the respective routable IP addresses changed). As a result of being unable to maintain access to the other nodes throughout the network reconfiguration process, the driving node may be prevented from controlling the execution of the network reconfiguration process across the nodes throughout the network reconfiguration process. Also, in the event of a network reconfiguration failure at one or more of the other nodes, the driving node may be unable to reconnect to the failed nodes to determine a cause of the network reconfiguration failures—e.g., if the failed nodes are unable to apply the new network configuration and unable to revert to the preceding network configuration, if an IP conflict or firewall conflict prevents the driving node from connecting to the failed nodes using the newly configured network configuration, etc. In such cases, a customer may be required to individually log into the failed nodes—e.g., using a local network connection and local IP address (e.g., 192.168.1.x)—to troubleshoot issues associated with applying the new network configuration. In some examples, the customer may be required to reset (e.g., to factory settings) one or more of the failed nodes to gain access. Similarly, the driving node may be unable to reconnect to the failed nodes to perform validation operations associated with verifying whether the network configuration has been successfully applied throughout a network-reconfigured node.

At 340, prior to implementing the new network configuration across the cluster of nodes, a backup of the existing network configuration across the nodes may be generated (e.g., by the driving node). In some examples, the backup of the existing network configuration may include generating, for each node in the cluster, a backup of current IP configuration files for all network interfaces associated with the cluster.

At 345, new IP configuration files may be generated (e.g., by the driving node) for each node in the cluster. The new IP configuration files may be configured in accordance with the new network configuration received for the cluster.

At 350, the new network configuration may be applied to the nodes of the cluster. In some examples, applying the new network configuration involves restarting the network service of the nodes—e.g., after loading the new IP configuration files at the nodes. In some examples, the new network configuration may be applied by restarting the network services of the nodes based on the driving network interface remaining the same, the driving native network interface remaining the same, or both.

In some examples, as part of applying the new network configuration, application configurations at the other nodes may be modified (e.g., by the driving node) in accordance with the respective new network configurations at the other nodes. For example, a configuration of a database application (e.g., CockroachDB®) at a node may be modified in accordance with a respective new network configuration.

In some examples, after the new network configuration is applied, one or more operations associated with validating whether the new network configuration has been successfully applied across the cluster may be performed.

At 355, the other nodes in the cluster may be "pinged" (e.g., by the driving node). Pinging the other nodes may include sending, by the driving node, a message to the new routable IP addresses associated other nodes that requests a response from the other nodes confirming that the message was received.

At 360, IP issues may be detected (e.g., by the driving node) based on a result of the ping operation. In some examples, the driving node may determine there is an IP issue if a response is not received from one or more of the other nodes. In some examples, the driving node may determine there is an IP issue if a received response originated from an unexpected node—e.g., if a MAC address included in a response to a ping sent to a particular node does not match the expected MAC address of the particular node. In some examples, the driving node may determine there is an IP issue if multiple responses are received to a ping, which may be indicative of multiple nodes being assigned a same IP (which may be referred to as an IP conflict).

At 365, the driving node may establish an SSH connection to the other nodes—e.g., using the respective link local addresses.

At 370, local and external connectivity of the nodes in the cluster may be confirmed (e.g., by the driving node)—e.g., based on establishing an SSH connection to the other nodes. In some examples, the driving node may cause the other nodes to respectively ping (e.g., using the new routable IP addresses) each of the other nodes in the cluster on each network interface—e.g., to confirm that each node has connectivity to each of the other nodes on each network interface. Additionally, or alternatively, the driving node may cause each node to ping a new gateway node to confirm that each node has external connectivity using the new network configuration.

At 375, application-level connectivity may be confirmed (e.g., by the driving node)—e.g., based on establishing an SSH connection to the other nodes. In some examples, network connectivity for the applications may be confirmed—e.g., for CockroachDB®, by executing a node status command. In some examples, connectivity of one application is dependent on connectivity of another application. As such, the driving node may be configured to validate the connectivity of the applications at a node accordingly. Also, in some examples, the driving node may stop validating the connectivity of dependent applications after connectivity issues for an application are identified—e.g., to conserve processing resources. In some examples, application-level connectivity may not be confirmed (e.g., if an expedited network reconfiguration procedure is performed).

In some examples, one or more of the network reconfiguration validation operations may be omitted. Additionally, or alternatively, additional network reconfiguration validation operations, other than those described above, may be performed.

At 380, a network reconfiguration failure associated with applying the new network configuration to the cluster of nodes may be identified—e.g., based on a failure that occurred during the application of the new network configuration to the nodes (e.g., a particular network reconfiguration operation that failed at a particular node), based on a failure that occurred during the validation of the new network configuration at the nodes (e.g., a particular network reconfiguration validation operation that failed at a particular node). In some examples, a network reconfiguration failure may not be identified (e.g., if no network reconfiguration failure occurs).

At 385, an alert may be sent to the customer that indicates one or more causes of the network reconfiguration failure identified by the driving node—e.g., one or more particular network reconfiguration operations that failed at one or more particular nodes, one or more particular network reconfiguration validation operations that failed at one or more particular nodes. The alert may also indicate to the customer whether the network reconfiguration dry run encountered any (critical or warning-level) issues. Critical issues may be associated with issues that prevent one or more nodes in the cluster from maintaining local connectivity to the other nodes in the cluster, external connectivity to the other nodes in the cluster, external connectivity to one or more external devices, or any combination thereof—e.g. as the customer may be prevented from accessing the one or more nodes to address the connectivity issues from a remote terminal. Warning-level issues may be associated with issues that prevent local or external connectivity at an application level at one or more nodes—e.g. as the customer may be capable of accessing the one or more nodes to address the application-level issues from a remote terminal. In some examples, the alert may not be sent to the customer (e.g., if a network reconfiguration failure is not identified).

At 390, the network configuration of the cluster may be "rolled back" to the network configuration that was configured for the cluster (referred to in 310, for example, as the existing network configuration) prior to the new network configuration being applied. In some examples, the driving node may reconfigure the preceding network configuration using the backed up version of the network configuration obtained at 340. In some examples, reconfiguring the preceding network configuration may similarly involve restarting the network service of the nodes—e.g., after loading the preceding IP configuration files at the nodes. In some examples, the network configuration may not be rolled back (e.g., if a network reconfiguration failure is not identified).

In some examples, the network configuration of the cluster may be rolled back based on a network reconfiguration failure being identified during the network configuration application or network configuration validation procedures.

In some examples, the network configuration of the cluster may be rolled back based on the network reconfiguration being executed in a dry run mode—e.g., regardless of whether any network reconfiguration failures are identified. If the dry run mode is enabled, the driving node may send an alert to the customer indicating whether the network reconfiguration dry run completed successfully. The alert may also indicate to the customer whether the network reconfiguration encountered any (critical or warning-level) issues during the dry run.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
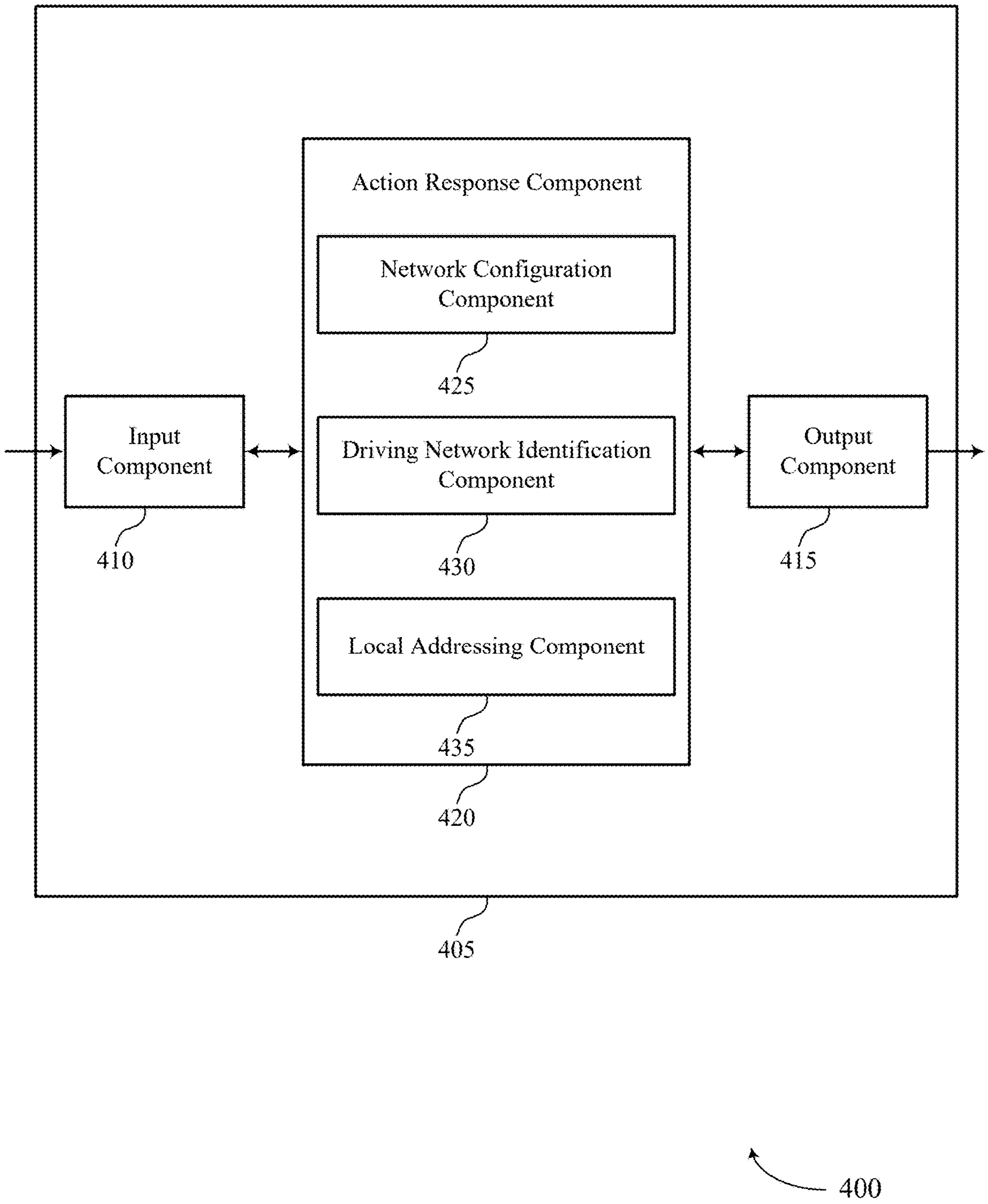
FIG. 4 shows a block diagram of an apparatus that supports network reconfiguration for cluster in accordance with aspects of the present disclosure.

FIG. 4 shows a block diagram 400 of an apparatus 405 that supports network reconfiguration for cluster in accordance with aspects of the present disclosure. In some examples, the apparatus 405 may be an example of aspects of one or more components described with reference to FIG. 1, such as a DMS 110. The apparatus 405 may include an input component 410, an output component 415, and a data manager 420. The apparatus 405 may also include one or more processors. Each of these components may be in communication with one another (e.g., via one or more buses, communications links, communications interfaces, or any combination thereof).

The input component 410 may manage input signals for the apparatus 405. For example, the input component 410 may identify input signals based on an interaction with a modem, a keyboard, a mouse, a touchscreen, or a similar device. These input signals may be associated with user input or processing at other components or devices. In some cases, the input component 410 may utilize an operating system such as iOS®, ANDROID®, MS-DOS®, MS-WINDOWS®, OS/2®, UNIX®, LINUX®, or another known operating system to handle input signals. The input component 410 may send aspects of these input signals to other components of the apparatus 405 for processing. For example, the input component 410 may transmit input signals to the data manager 420 to support network reconfiguration for cluster. In some cases, the input component 410 may be a component of an I/O controller 610 as described with reference to FIG. 6.

The output component 415 may manage output signals for the apparatus 405. For example, the output component 415 may receive signals from other components of the apparatus 405, such as the data manager 420, and may transmit these signals to other components or devices. In some specific examples, the output component 415 may transmit output signals for display in a user interface, for storage in a database or data store, for further processing at a server or server cluster, or for any other processes at any number of devices or systems. In some cases, the output component 415 may be a component of an I/O controller 610 as described with reference to FIG. 6.

For example, the data manager 420 may include a network configuration component 425, a driving network identification component 430, a local addressing component 435, or any combination thereof. In some examples, the data manager 420, or various components thereof, may be configured to perform various operations (e.g., receiving, monitoring, transmitting) using or otherwise in cooperation with the input component 410, the output component 415, or both. For example, the data manager 420 may receive information from the input component 410, send information to the output component 415, or be integrated in combination with the input component 410, the output component 415, or both to receive information, transmit information, or perform various other operations as described herein.

The network configuration component 425 may be configured as or otherwise support a means for receiving, at a cluster including a set of multiple nodes, a new network configuration for the cluster, where respective nodes of the set of multiple nodes have respective routable network addresses in accordance with an existing network configuration of the cluster, and where the new network configuration is configured to change the respective routable network addresses of the respective nodes relative to the existing network configuration. The driving network identification component 430 may be configured as or otherwise support a means for identifying, based on receiving the new network configuration, a driving network interface between the existing network configuration and the new network configuration. The local addressing component 435 may be configured as or otherwise support a means for determining, based on identifying the driving network interface, that the respective nodes are communicatively coupled over the driving network interface using respective local network addresses of the respective nodes. The network configuration component 425 may be configured as or otherwise support a means for executing, based on the respective nodes being communicatively coupled via the driving network interface using the respective local network addresses, a process for configuring the new network configuration at the cluster via the driving network interface.

Figure 5:
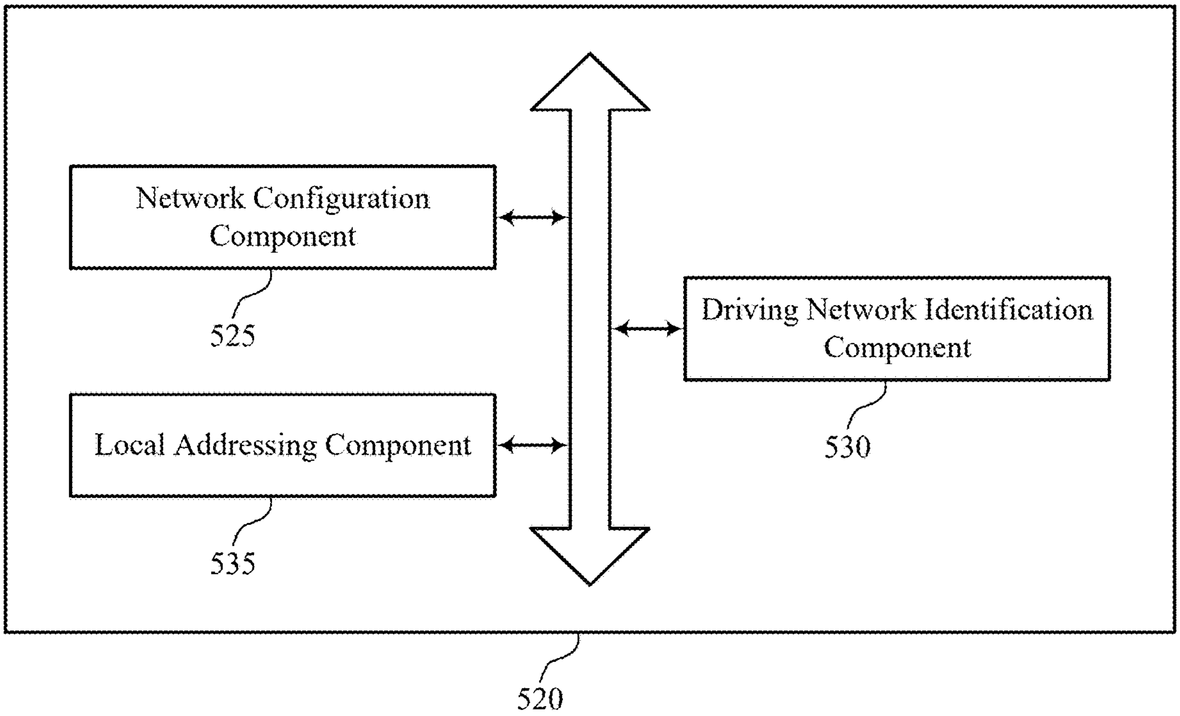
FIG. 5 shows a block diagram of a data manager that supports network reconfiguration for cluster in accordance with aspects of the present disclosure.

FIG. 5 shows a block diagram 500 of a data manager 520 that supports network reconfiguration for cluster in accordance with aspects of the present disclosure. The data manager 520 may be an example of aspects of a data manager or a data manager 420, or both, as described herein. The data manager 520, or various components thereof, may be an example of means for performing various aspects of network reconfiguration for cluster as described herein. For example, the data manager 520 may include a network configuration component 525, a driving network identification component 530, a local addressing component 535, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The network configuration component 525 may be configured as or otherwise support a means for receiving, at a cluster including a set of multiple nodes, a new network configuration for the cluster, where respective nodes of the set of multiple nodes have respective routable network addresses in accordance with an existing network configuration of the cluster, and where the new network configuration is configured to change the respective routable network addresses of the respective nodes relative to the existing network configuration. The driving network identification component 530 may be configured as or otherwise support a means for identifying, based on receiving the new network configuration, a driving network interface between the existing network configuration and the new network configuration. The local addressing component 535 may be configured as or otherwise support a means for determining, based on identifying the driving network interface, that the respective nodes are communicatively coupled over the driving network interface using respective local network addresses of the respective nodes. In some examples, the network configuration component 525 may be configured as or otherwise support a means for executing, based on the respective nodes being communicatively coupled via the driving network interface using the respective local network addresses, a process for configuring the new network configuration at the cluster via the driving network interface.

In some examples, the network configuration component 525 may be configured as or otherwise support a means for determining, based on receiving the new network configuration, that the existing network configuration and the new network configuration are uniform network configurations, where the driving network interface is identified based on the existing network configuration and the new network configuration being uniform network configurations.

In some examples, one or more network interfaces included in both the existing network configuration and the new network configuration remain unchanged throughout the process for configuring the new network configuration, and the driving network interface is selected from the one or more network interfaces based on the selected network interface supporting direct communications between the set of multiple nodes using local network addresses.

In some examples, one or more native network interfaces associated with both the existing network configuration and the new network configuration remain unchanged throughout the process for configuring the new network configuration, and the driving network interface is selected from the one or more native network interfaces based on the selected native network interface supporting direct communications between the set of multiple nodes using local network addresses.

In some examples, each network interface included in both the existing network configuration and the new network configuration is changed as a result of the process for configuring the new network configuration, each network interface being a virtual local area network (VLAN) interface.

In some examples, executing the process for configuring the new network configuration at the cluster includes performing, prior to applying the new network configuration to the set of multiple nodes, an operation for storing the existing network configuration of the cluster.

In some examples, operations of the process for configuring the new network configuration at the cluster are synchronously performed at the set of multiple nodes.

In some examples, executing the process for configuring the new network configuration at the cluster includes performing, after the new network configuration has been applied to the set of multiple nodes, one or more operations for confirming the new network configuration has been successfully applied across the set of multiple nodes.

In some examples, the network configuration component 525 may be configured as or otherwise support a means for executing, based on the new network configuration being unsuccessfully applied to at least one of the set of multiple nodes, a second process for reconfiguring the existing network configuration at each of the set of multiple nodes.

In some examples, the network configuration component 525 may be configured as or otherwise support a means for executing, based on a dry run mode being enabled, a second process for reconfiguring the existing network configuration at each of the set of multiple nodes.

In some examples, the respective routable network addresses include Internet Protocol (IP) version 4 (IPv4) addresses, IP version 6 (IPv6) addresses, or both, and the respective local network addresses are link local IPv6 addresses.

In some examples, the driving network interface is an ethernet interface with virtual local area network (VLAN) enabled or disabled.

In some examples, the driving network interface remains accessible throughout the process for configuring the new network configuration at the cluster.

In some examples, the driving network interface supports direct communications between the set of multiple nodes using local network addresses.

Figure 6:
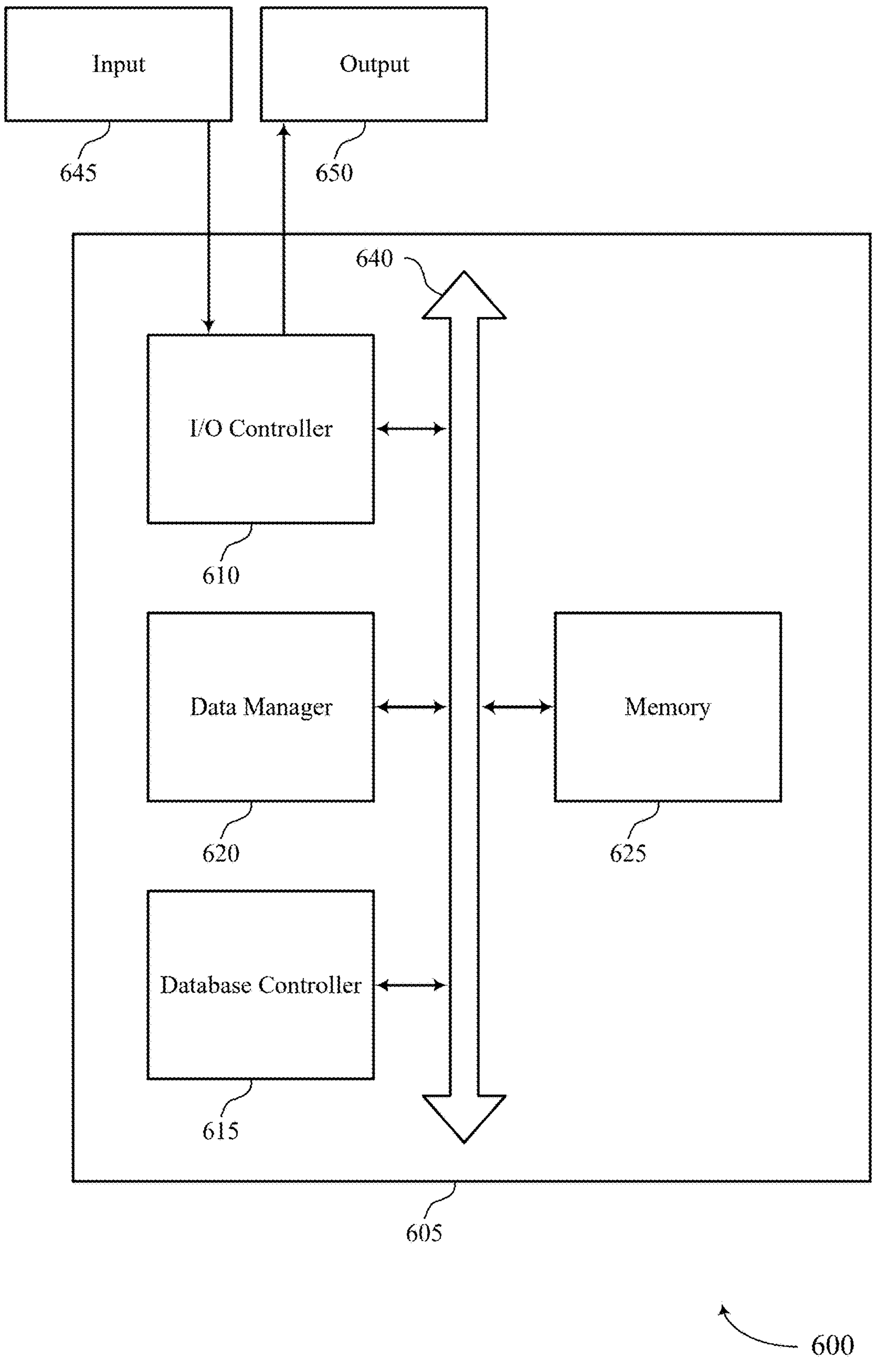
FIG. 6 shows a diagram of a system including a device that supports network reconfiguration for cluster in accordance with aspects of the present disclosure.

FIG. 6 shows a block diagram 600 of a system that supports network reconfiguration for cluster in accordance with aspects of the present disclosure. The device 605 may be an example of or include components of an apparatus 405 as described herein. The device 605 may include components for data management, including components such as a data manager 620, an I/O controller, such as an I/O controller 610, a database controller 615, at least one memory 625, at least one processor 630, and a database. These components may be in electronic communication or otherwise coupled with each other (e.g., operatively, communicatively, functionally, electronically, electrically; via one or more buses 640, communications links, communications interfaces, or any combination thereof). Additionally, the components of the device 605 may include corresponding physical components or may be implemented as corresponding virtual components (e.g., components of one or more virtual machines). In some examples, the device 605 may be an example of aspects of one or more components described with reference to FIG. 1, such as a DMS 110.

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some cases, the I/O controller 610 may be implemented as part of a processor. In some examples, a user may interact with the device 605 via the I/O controller 610 or via hardware components controlled by the I/O controller 610.

The database controller 615 may manage data storage and processing in a database. The database may be external to the device 605, temporarily or permanently connected to the device 605, or a data storage component of the device 605. In some cases, a user may interact with the database controller 615. In some other cases, the database controller 615 may operate automatically without user interaction. The database may be an example of a persistent data store, a single database, a distributed database, multiple distributed databases, a database management system, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting network reconfiguration for cluster).

For example, the data manager 620 may be configured as or otherwise support a means for receiving, at a cluster including a set of multiple nodes, a new network configuration for the cluster, where respective nodes of the set of multiple nodes have respective routable network addresses in accordance with an existing network configuration of the cluster, and where the new network configuration is configured to change the respective routable network addresses of the respective nodes relative to the existing network configuration. The data manager 620 may be configured as or otherwise support a means for identifying, basing at least in part on receiving the new network configuration, a driving network interface between the existing network configuration and the new network configuration. The data manager 620 may be configured as or otherwise support a means for determining, based on identifying the driving network interface, that the respective nodes are communicatively coupled over the driving network interface using respective local network addresses of the respective nodes. The data manager 620 may be configured as or otherwise support a means for executing, basing at least in part on the respective nodes being communicatively coupled via the driving network interface using the respective local network addresses, a process for configuring the new network configuration at the cluster via the driving network interface.

By including or configuring the data manager 620 in accordance with examples as described herein, the device 605 may support techniques for network reconfiguration for cluster, which may provide one or more benefits such as, for example, providing additional control and visibility into a cluster network reconfiguration procedure and supporting network configuration roll back, among other possibilities.

Figure 7:
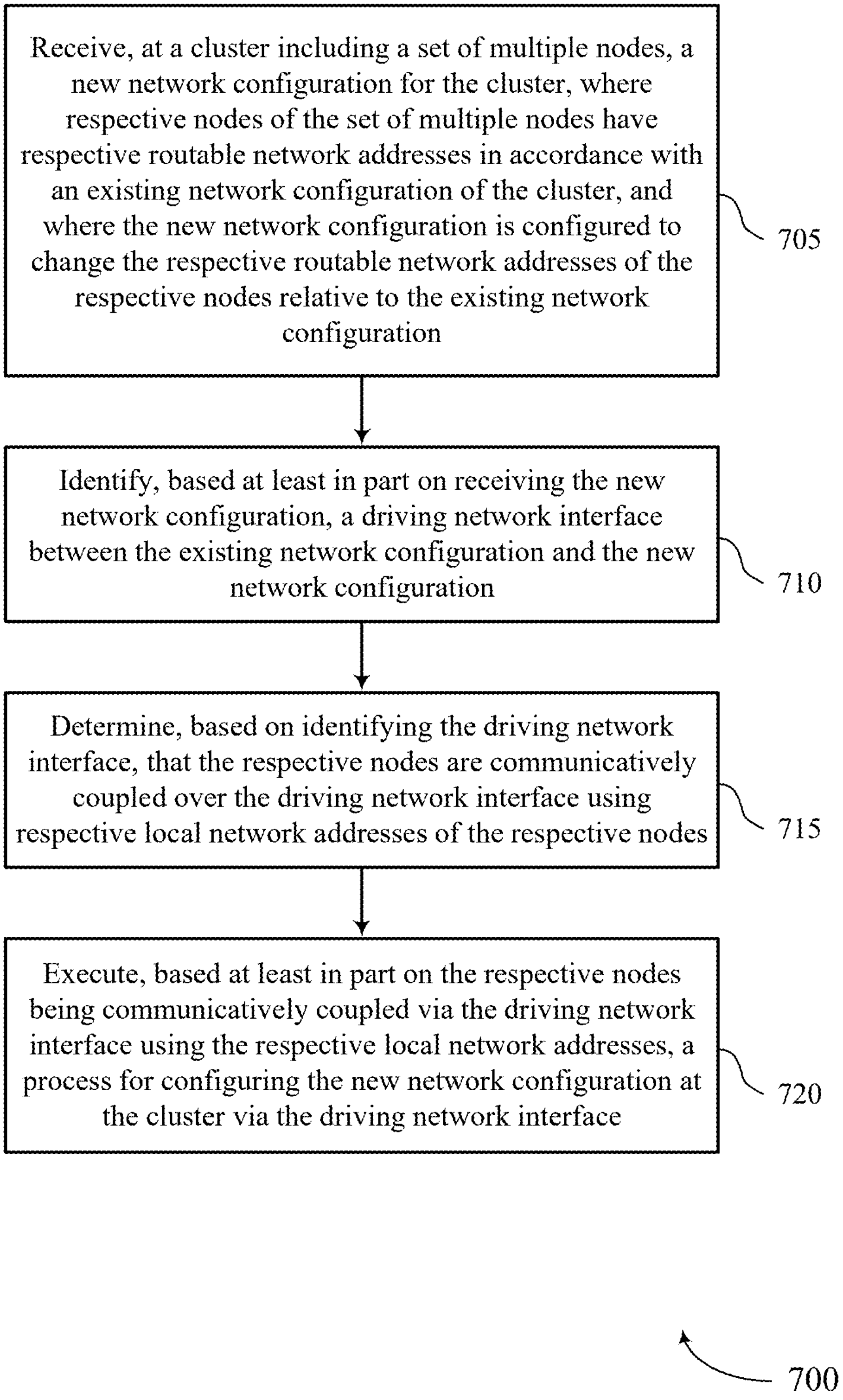
FIG. 7 shows a flowchart illustrating methods that support network reconfiguration for cluster in accordance with aspects of the present disclosure.

FIG. 7 shows a flowchart illustrating a method 700 that supports network reconfiguration for cluster in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at a cluster including a set of multiple nodes, a new network configuration for the cluster, where respective nodes of the set of multiple nodes have respective routable network addresses in accordance with an existing network configuration of the cluster, and where the new network configuration is configured to change the respective routable network addresses of the respective nodes relative to the existing network configuration. The operations of 705 may be performed in accordance with examples as disclosed herein. In some examples, aspects of the operations of 705 may be performed by a network configuration component 525 as described with reference to FIG. 5.

At 710, the method may include identifying, based on receiving the new network configuration, a driving network interface between the existing network configuration and the new network configuration. The operations of 710 may be performed in accordance with examples as disclosed herein. In some examples, aspects of the operations of 710 may be performed by a driving network identification component 530 as described with reference to FIG. 5.

At 715, the method may include determining, based on identifying the driving network interface, that the respective nodes are communicatively coupled over the driving network interface using respective local network addresses of the respective nodes. The operations of 715 may be performed in accordance with examples as disclosed herein. In some examples, aspects of the operations of 715 may be performed by a local addressing component 535 as described with reference to FIG. 5.

At 720, the method may include executing, based on the respective nodes being communicatively coupled via the driving network interface using the respective local network addresses, a process for configuring the new network configuration at the cluster via the driving network interface. The operations of 720 may be performed in accordance with examples as disclosed herein. In some examples, aspects of the operations of 720 may be performed by a network configuration component 525 as described with reference to FIG. 5.

The following provides an overview of aspects of the present disclosure:

Aspect 1: A method, comprising: receiving, at a cluster comprising a plurality of nodes, a new network configuration for the cluster, wherein respective nodes of the plurality of nodes have respective routable network addresses in accordance with an existing network configuration of the cluster, and wherein the new network configuration is configured to change the respective routable network addresses of the respective nodes relative to the existing network configuration; identifying, based at least in part on receiving the new network configuration, a driving network interface between the existing network configuration and the new network configuration; determining, based at least in part on identifying the driving network interface, that the respective nodes are communicatively coupled over the driving network interface using respective local network addresses of the respective nodes; and executing, based at least in part on the respective nodes being communicatively coupled via the driving network interface using the respective local network addresses, a process for configuring the new network configuration at the cluster via the driving network interface.

Aspect 2: The method of aspect 1, further comprising: determining, based at least in part on receiving the new network configuration, that the existing network configuration and the new network configuration are uniform network configurations, wherein the driving network interface is identified based at least in part on the existing network configuration and the new network configuration being uniform network configurations.

Aspect 3: The method of any of aspects 1 through 2, wherein one or more network interfaces included in both the existing network configuration and the new network configuration remain unchanged throughout the process for configuring the new network configuration, and the driving network interface is selected from the one or more network interfaces based at least in part on the selected network interface supporting direct communications between the plurality of nodes using local network addresses.

Aspect 4: The method of any of aspects 1 through 3, wherein one or more native network interfaces associated with both the existing network configuration and the new network configuration remain unchanged throughout the process for configuring the new network configuration, and the driving network interface is selected from the one or more native network interfaces based at least in part on the selected native network interface supporting direct communications between the plurality of nodes using local network addresses.

Aspect 5: The method of aspect 4, wherein each network interface included in both the existing network configuration and the new network configuration is changed as a result of the process for configuring the new network configuration, each network interface being a virtual local area network (VLAN) interface.

Aspect 6: The method of any of aspects 1 through 5, wherein executing the process for configuring the new network configuration at the cluster comprises performing, prior to applying the new network configuration to the plurality of nodes, an operation for storing the existing network configuration of the cluster.

Aspect 7: The method of any of aspects 1 through 6, wherein operations of the process for configuring the new network configuration at the cluster are synchronously performed at the plurality of nodes.

Aspect 8: The method of any of aspects 1 through 7, wherein executing the process for configuring the new network configuration at the cluster comprises performing, after the new network configuration has been applied to the plurality of nodes, one or more operations for confirming the new network configuration has been successfully applied across the plurality of nodes.

Aspect 9: The method of any of aspects 1 through 8, further comprising: executing, based at least in part on the new network configuration being unsuccessfully applied to at least one of the plurality of nodes, a second process for reconfiguring the existing network configuration at each of the plurality of nodes.

Aspect 10: The method of any of aspects 1 through 9, further comprising: executing, based at least in part on a dry run mode being enabled, a second process for reconfiguring the existing network configuration at each of the plurality of nodes.

Aspect 11: The method of any of aspects 1 through 10, wherein the respective routable network addresses comprise Internet Protocol (IP) version 4 (IPv4) addresses, IP version 6(IPv6) addresses, or both, and the respective local network addresses are link local IPv6 addresses.

Aspect 12: The method of any of aspects 1 through 11, wherein the driving network interface is an ethernet interface with virtual local area network (VLAN) enabled or disabled.

Aspect 13: The method of any of aspects 1 through 12, wherein the driving network interface remains accessible throughout the process for configuring the new network configuration at the cluster.

Aspect 14: The method of any of aspects 1 through 13, wherein the driving network interface supports direct communications between the plurality of nodes using local network addresses.

Aspect 15: An apparatus comprising one or more memories storing processor-executable code, and one or more processors coupled with the one or more memories and individually or collectively operable to execute the code to cause the apparatus to perform a method of any of aspects 1 through 14.

Aspect 16: An apparatus comprising at least one means for performing a method of any of aspects 1 through 14.

Aspect 17: A non-transitory computer-readable medium storing code the code comprising instructions executable by one or more processors to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns.

Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, at a cluster comprising a plurality of nodes, a new network configuration for the cluster, wherein respective nodes of the plurality of nodes have respective routable network addresses in accordance with an existing network configuration of the cluster, and wherein the new network configuration is configured to change the respective routable network addresses of the respective nodes relative to the existing network configuration;

identifying, based at least in part on receiving the new network configuration, a driving network interface between the existing network configuration and the new network configuration;

determining, based at least in part on identifying the driving network interface, that the respective nodes are communicatively coupled over the driving network interface using respective local network addresses of the respective nodes; and executing, based at least in part on the respective nodes being communicatively coupled via the driving network interface using the respective local network addresses, a process for configuring the new network configuration at the cluster via the driving network interface.

2. The method of claim 1, further comprising:

determining, based at least in part on receiving the new network configuration, that the existing network configuration and the new network configuration are uniform network configurations, wherein the driving network interface is identified based at least in part on the existing network configuration and the new network configuration being uniform network configurations.

3. The method of claim 1, wherein:

one or more network interfaces included in both the existing network configuration and the new network configuration remain unchanged throughout the process for configuring the new network configuration, and the driving network interface is selected from the one or more network interfaces based at least in part on the selected network interface supporting direct communications between the plurality of nodes using local network addresses.

4. The method of claim 1, wherein:

one or more native network interfaces associated with both the existing network configuration and the new network configuration remain unchanged throughout the process for configuring the new network configuration, and the driving network interface is selected from the one or more native network interfaces based at least in part on the selected native network interface supporting direct communications between the plurality of nodes using local network addresses.

5. The method of claim 4, wherein each network interface included in both the existing network configuration and the new network configuration is changed as a result of the process for configuring the new network configuration, each network interface being a virtual local area network (VLAN) interface.

6. The method of claim 1, wherein executing the process for configuring the new network configuration at the cluster comprises:

performing, prior to applying the new network configuration to the plurality of nodes, an operation for storing the existing network configuration of the cluster.

7. The method of claim 1, wherein operations of the process for configuring the new network configuration at the cluster are synchronously performed at the plurality of nodes.

8. The method of claim 1, wherein executing the process for configuring the new network configuration at the cluster comprises:

performing, after the new network configuration has been applied to the plurality of nodes, one or more operations for confirming the new network configuration has been successfully applied across the plurality of nodes.

9. The method of claim 1, further comprising:

executing, based at least in part on the new network configuration being unsuccessfully applied to at least one of the plurality of nodes, a second process for reconfiguring the existing network configuration at each of the plurality of nodes.

10. The method of claim 1, further comprising:

executing, based at least in part on a dry run mode being enabled, a second process for reconfiguring the existing network configuration at each of the plurality of nodes.

11. The method of claim 1, wherein:

the respective routable network addresses comprise Internet Protocol (IP) version 4 (IPv4) addresses, IP version 6(IPv6) addresses, or both, and the respective local network addresses are link local IPv6 addresses.

12. The method of claim 1, wherein the driving network interface is an ethernet interface with virtual local area network (VLAN) enabled or disabled.

13. The method of claim 1, wherein the driving network interface remains accessible throughout the process for configuring the new network configuration at the cluster.

14. The method of claim 1, wherein the driving network interface supports direct communications between the plurality of nodes using local network addresses.

15. An apparatus, comprising:

one or more memories; and one or more processors, wherein the one or more memories store code comprising instructions executable, individually or collectively, by the one or more processors to cause the apparatus to:

receive, at a cluster comprising a plurality of nodes, a new network configuration for the cluster, wherein respective nodes of the plurality of nodes have respective routable network addresses in accordance with an existing network configuration of the cluster, and wherein the new network configuration is configured to change the respective routable network addresses of the respective nodes relative to the existing network configuration;

identify, based at least in part on receiving the new network configuration, a driving network interface between the existing network configuration and the new network configuration;

determine, based at least in part on identifying the driving network interface, that the respective nodes are communicatively coupled over the driving network interface using respective local network addresses of the respective nodes; and execute, based at least in part on the respective nodes being communicatively coupled via the driving network interface using the respective local network addresses, a process for configuring the new network configuration at the cluster via the driving network interface.

16. The apparatus of claim 15, wherein the instructions are further executable, individually or collectively, by the one or more processors to cause the apparatus to:

determine, based at least in part on receiving the new network configuration, that the existing network configuration and the new network configuration are uniform network configurations, wherein the driving network interface is identified based at least in part on the existing network configuration and the new network configuration being uniform network configurations.

17. The apparatus of claim 15, wherein the instructions are further executable, individually or collectively, by the one or more processors to cause the apparatus to:

execute, based at least in part on the new network configuration being unsuccessfully applied to at least one of the plurality of nodes, a second process for reconfiguring the existing network configuration at each of the plurality of nodes.

18. A non-transitory, computer-readable medium storing code that comprises instructions that are executable, individually or collectively, by one or more processors of a device to cause the device to:

receive, at a cluster comprising a plurality of nodes, a new network configuration for the cluster, wherein respective nodes of the plurality of nodes have respective routable network addresses in accordance with an existing network configuration of the cluster, and wherein the new network configuration is configured to change the respective routable network addresses of the respective nodes relative to the existing network configuration;

identify, based at least in part on receiving the new network configuration, a driving network interface between the existing network configuration and the new network configuration;

determine, based at least in part on identifying the driving network interface, that the respective nodes are communicatively coupled over the driving network interface using respective local network addresses of the respective nodes; and execute, based at least in part on the respective nodes being communicatively coupled via the driving network interface using the respective local network addresses, a process for configuring the new network configuration at the cluster via the driving network interface.

19. The non-transitory, computer-readable medium of claim 18, wherein the instructions are further executable, individually or collectively, by the one or more processors to cause the device to:

determine, based at least in part on receiving the new network configuration, that the existing network configuration and the new network configuration are uniform network configurations, wherein the driving network interface is identified based at least in part on the existing network configuration and the new network configuration being uniform network configurations.

20. The non-transitory, computer-readable medium of claim 18, wherein the instructions are further executable, individually or collectively, by the one or more processors to cause the device to:

execute, based at least in part on the new network configuration being unsuccessfully applied to at least one of the plurality of nodes, a second process for reconfiguring the existing network configuration at each of the plurality of nodes.

* * * * *